(12) United States Patent
Aquilante

(10) Patent No.: US 7,131,906 B1
(45) Date of Patent: Nov. 7, 2006

(54) READY-TO-COOK BIRD PRODUCT

(76) Inventor: Anthony A. Aquilante, P.O. Box 760, Valley Forge, PA (US) 19482

(*) Notice: Subject to any disclaimer, the term of this patent is extended or adjusted under 35 U.S.C. 154(b) by 0 days.

(21) Appl. No.: 11/195,413

(22) Filed: Aug. 2, 2005

(51) Int. Cl.
*A22B 5/00* (2006.01)
(52) U.S. Cl. .................................................... 452/198
(58) Field of Classification Search .................. None
See application file for complete search history.

(56) References Cited

U.S. PATENT DOCUMENTS

| | | | |
|---|---|---|---|
| 1,433,628 A * | 10/1922 | Knaust | .................... 452/107 |
| 2,404,166 A | 7/1946 | Danilla | |
| 2,571,544 A * | 10/1951 | Cutrera | .................... 452/106 |
| 2,651,251 A | 9/1953 | Brown | |
| 2,835,480 A | 5/1958 | Perez | |
| 2,844,844 A * | 7/1958 | Sieczkiewicz | ............. 452/135 |
| 3,584,683 A | 6/1971 | Gordon | |
| 3,709,141 A | 1/1973 | Schwartzstein | |
| 3,942,222 A | 3/1976 | Strandine | |
| 3,980,010 A | 9/1976 | Collinucci | |
| 4,127,060 A | 11/1978 | Curtis | |
| 4,715,273 A | 12/1987 | Riesselmann | |
| 5,001,971 A * | 3/1991 | Beller | ...................... 99/421 H |
| 5,057,331 A * | 10/1991 | Levinson | .................... 426/243 |
| 5,248,081 A * | 9/1993 | Hook | .................... 229/117.14 |
| 5,598,769 A * | 2/1997 | Luebke et al. | ................ 99/395 |
| 5,662,028 A | 9/1997 | Fraga | |
| 5,918,534 A | 7/1999 | Medina | |
| 6,265,004 B1 | 7/2001 | Cagle | |
| 6,725,764 B1 | 4/2004 | Sherwin | |
| 6,769,977 B1 | 8/2004 | Kuck | |

OTHER PUBLICATIONS

Declaration of Anthony A Aquilante dated Aug. 3, 2006.

* cited by examiner

*Primary Examiner*—Thomas Price
(74) *Attorney, Agent, or Firm*—RatnerPrestia

(57) ABSTRACT

An edible bird with an internal cavity provided by removal of the visceral parts of the bird and most or all of the internal bone structure. Disposed within the cavity of the bird body, is an edible filling and heat transfer elements to transfer heat directly into the edible filling when the bird is cooked.

16 Claims, 4 Drawing Sheets

READY-TO-COOK BIRD PRODUCT

FIELD OF THE INVENTION

The present invention is directed to an edible food product, and more particularly, to a ready-to-cook stuffed edible bird.

BACKGROUND OF THE INVENTION

Commercial food providers have generally avoided cooking and selling of stuffed poultry products. Among the reasons for this may be that bacterial contamination is thought to be more pronounced when a bird, such as a turkey, is stuffed before cooking.

Thoroughly cooking a bird eliminates harmful bacteria inherent in any poultry food product. The dangers of the bacteria inherent in a poultry product are, however, exacerbated with the addition of traditional stuffing in the cavity of the bird because the additional stuffing extends the time required to thoroughly cook the bird. To extend the cooking time so that the harmful bacterial are destroyed may lead to the exterior of the bird being overcooked. A significant source of such harmful bacteria are residual bits of the visceral parts which are ordinarily removed and any other organic matter which tends to be trapped in the crevices of the bird's internal bone structure.

SUMMARY OF THE INVENTION

According to an exemplary embodiment of a food product of the present invention, the food product is an edible whole or half bird having a body and body cavity from which the visceral parts and most or all of the internal bone structure has been removed. Disposed within the body cavity is an edible filling such as that which has been traditionally referred to as "stuffing" or "dressing." The edible food product also has at least one heat transfer element passing into the edible filling or passing from the exterior of the stuffed bird through some part of the body of the bird into the body cavity having the edible filling therein.

According to another exemplary embodiment, the food product is a ready-to-cook frozen half or whole turkey body having stuffing occupying substantially all of a body cavity formed by the removal of the turkey visceral parts, rib cage, breastplate, and most of the backbone of the of the turkey. At least one heat transfer element is inserted into the turkey, the heat transfer element having a length sufficient to penetrate some part of the turkey body and at least a portion of the stuffing in the body cavity. A second food portion, such as a boneless breast from another bird may also be included in the body cavity, typically lodged against the inner surface of the breast of the first bird and held in place by the stuffing in the body cavity.

An exemplary method to prepare an edible bird with a body cavity and stuffing in the body cavity includes eviscerating the edible bird by removing substantially all of the interior bone structure and visceral parts to form a body cavity of the bird. Stuffing is inserted into the body cavity of the bird. At least one heat transfer element adapted to penetrate the body of the bird and to conduct heat from the exterior of the bird body into the stuffing in the body cavity is inserted into the bird body and stuffing. Lastly, the bird with the stuffing and the at least one heat transfer member therein is frozen. The frozen bird may then be cut in half and packaged and sold as a half bird.

Still yet a further exemplary embodiment of the present invention includes a food product kit. The kit includes a: (a) frozen, eviscerated and substantially internally deboned, edible bird having stuffing disposed within the eviscerated and deboned cavity and (b) one or more heat transfer elements adapted to expedite cooking of the stuffing concurrently with the cooking of the bird by placement in a position penetrating at least some portion of the stuffing therein and, optionally some part of the bird. The parts of the kit may be sold together or separately.

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

DETAILED DESCRIPTION OF THE INVENTION

Figure 1:
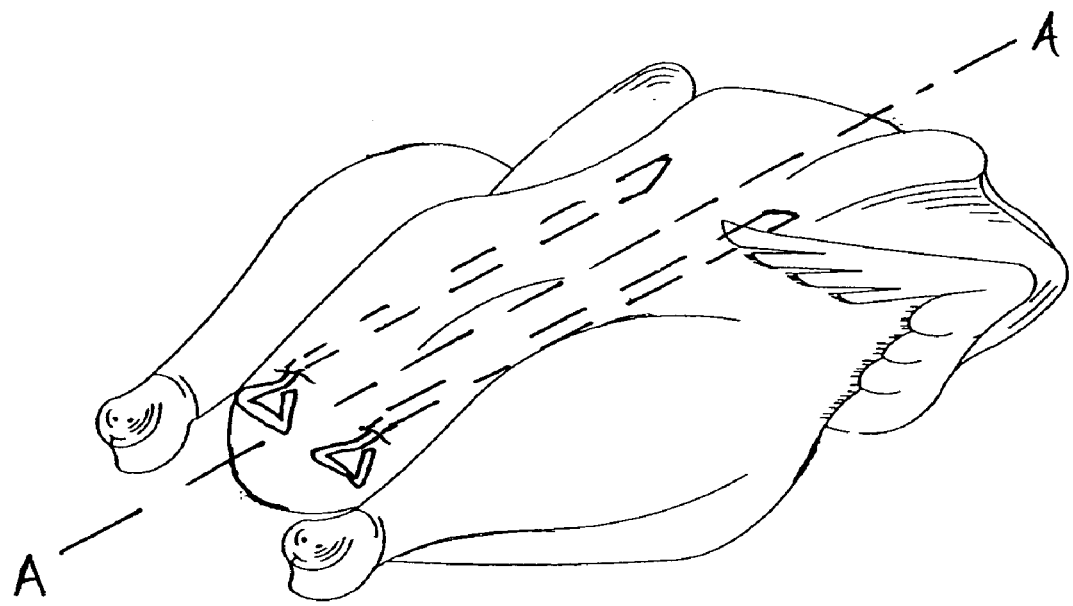
FIG. 1 illustrates an edible bird with two heat transfer elements inserted therein according to an exemplary embodiment of the present invention.

With reference now to the Figures, where like reference numerals refer to like features, FIG. 1 illustrates an exemplary embodiment of a poultry food product of the invention. The food product is a ready to cook edible bird 10 having a body 20, wings 2, legs 4, thighs 6, and a breast 8. The edible bird which may be any typical culinary fowl, such as a turkey, chicken, duck, pheasant, goose, or quail, is represented in the embodiment of FIG. 1 as a turkey.

As illustrated in FIG. 1, the exemplary embodiment of the ready to cook edible bird 10 includes two heat transfer elements 34 inserted from the exterior of bird 10 through body 20 at the juncture of thighs 6 with bird body 20 in a direction substantially parallel to the backbone axis of the bird shown by line A.

Figure 2:
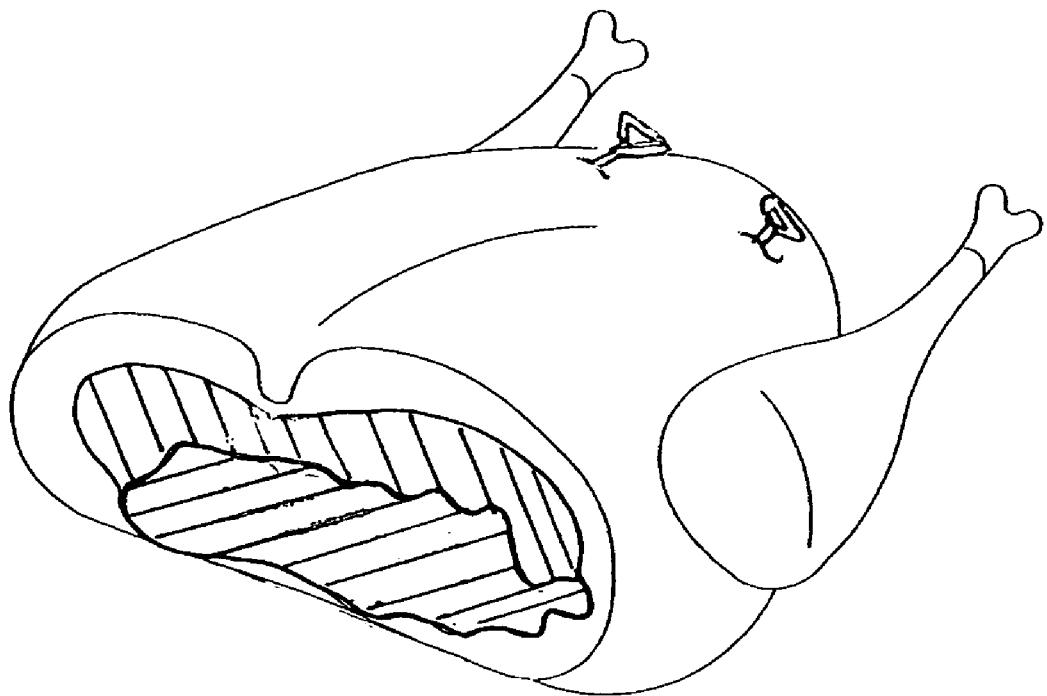
FIG. 2 is a cross-section of the edible bird in FIG. 1 illustrating the inside cavity of an edible bird according to an exemplary embodiment of the present invention.

FIG. 2 is a cross-section of the edible bird 10 shown in FIG. 1, sliced as it might be for consumption, showing the partially cut away body cavity 14 of edible bird 10 filled with an edible filling 16 and including a portion of a solid or semi-solid food 18, in this case a breast of a separate bird disposed between the interior surface 21 of bird body 20 and edible filling 16. Body cavity 14 is formed by eviscerating the bird, that is, by removing its visceral parts (organs, intestines, etc.) and by removing most or all of the bird's internal bone structure. The internal bone structure that is removed comprises the rib cage and breast plate, and at least a portion of the backbone. The portion of the backbone that is preferably removed includes up to 90% of the backbone, leaving a small portion of the backbone toward the tail end of the bird.

An exemplary process by which the bird is eviscerated and most of all of the internal bone structure is removed includes making an incision parallel to and along the backbone axis of the bird. The bird is laid open and the visceral parts are severed and removed. The thigh joints and wings joints are then severed. The backbone is then severed just above the tail portion. The entire rib cage, breast plate and backbone portion are then removed. Finally, the interior cavity of the bird is washed and cleaned.

Edible filling 16 may be any ingredient or mixture of ingredients, seasoned or unseasoned, that is inserted into body cavity 14 of edible bird 10. According to one exemplary embodiment, edible filing 16 is a traditional "stuffing" or "dressing."

Examples of solid or semi-solid food 18 include, but are not limited to, a mixture of seasoned ingredients different than edible filling 16, a portion of another bird of different type, or a portion of meat not from a bird, but from a different animal, for example, ham. According to an exemplary embodiment of the present invention, the solid or semi-solid food 18 is located against an inner surface of the bird body breast, which is part of an interior surface of body cavity 14. Therefore, when bird 10 is laid breast up as illustrated in FIG. 2, bird 10 has body cavity 14 stuffed with edible filling 16 and solid or semi-solid food 18, for example, a boneless breast of a second bird, inserted between edible filling 16 and the breast of bird 10. Alternatively, according to another embodiment of the present invention, edible bird 10 is only stuffed with edible filling 16.

Heat transfer element 34, as shown in FIG. 1, may extend along the length of bird 10, penetrating bird 10 at the tail-end, near the thigh-body joint. Inserted this way, heat transfer elements 34 pass through one side of body cavity 14 and through edible filling 16 disposed in body cavity 14. According to the embodiment shown in FIG. 1, heat transfer elements 34 have a sufficient length such that when inserted as previously described, heat transfer elements 34 also travel through to the opposite side of body cavity 14 at least touch or optionally to reenter bird body 20 near the wing-body joint of bird 10. According to yet another exemplary embodiment, heat transfer elements 34 can be inserted into bird 10 such that heat transfer elements 34 do not pass through a portion of bird 10 but directly enter the edible filling 16 disposed within body cavity 14 of edible bird 10.

Figure 3:
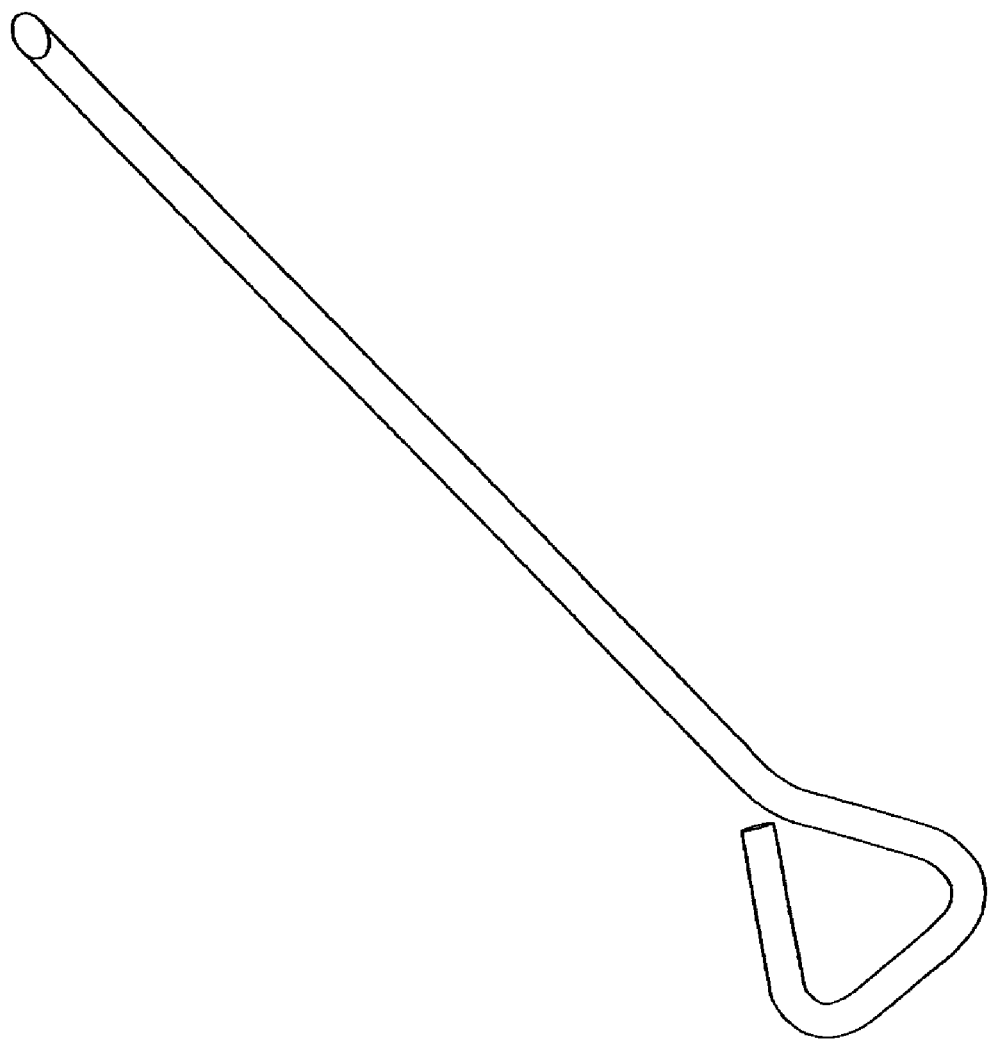
FIG. 3 illustrates a heat transfer element according to an exemplary embodiment of the present invention.

FIG. 3 illustrates one form of heat transfer element 34 useful in the is present invention. Heat transfer element 34 comprises a metallic, typically aluminum, rod 31 having a taper 30 at one end to facilitate penetration into a bird, and a handle 36 at the other end to facilitate removal of the rod after cooking. Any device capable of transferring heat from the exterior of the bird into the filled body cavity, which did not interfere with the edibility and safety of the bird as food, may serve as a suitable heat transfer element.

Heat transfer elements 34 function to transfer heat into the interior of the bird and particularly the edible filling in the body cavity of the bird so that the required time to sufficiently heat the filling is significantly reduced as compared to the time required to bring the filling to the same temperature without benefit of the heat transfer elements.

Combined with the exclusion of a significant source of bacterial contamination by the substantial internal deboning of the bird's body cavity, the heat transfers elements in the edible filling provide a safer form of a stuffed poultry product than has heretofore been available.

Figure 4:
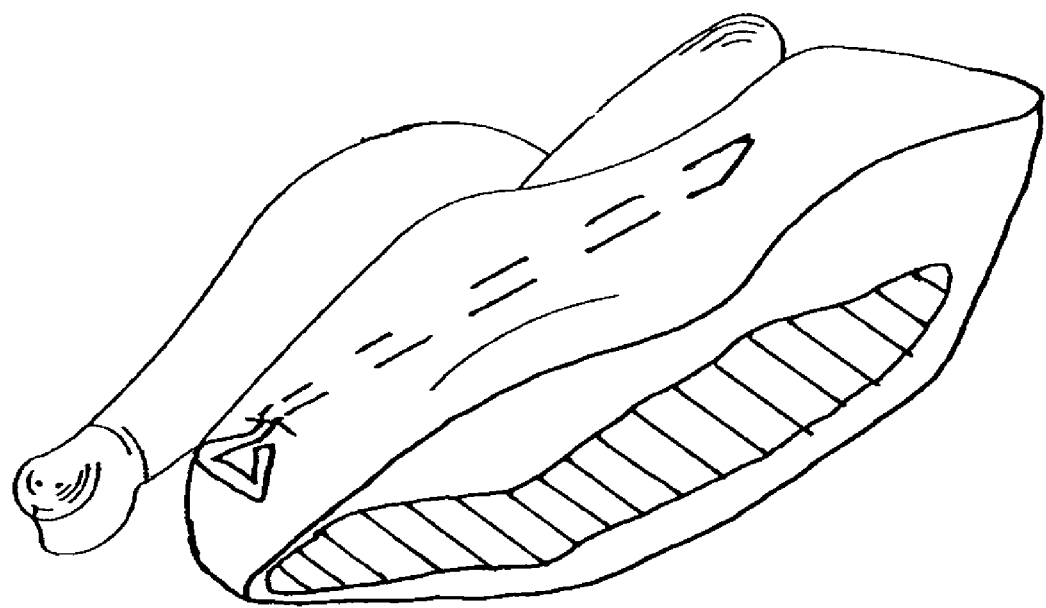
FIG. 4 illustrates a stuffed half edible bird according to another exemplary embodiment of the present invention.

FIG. 4 is another embodiment of a ready-to-cook edible food product according to the present invention. FIG. 4 illustrates an edible bird 40 cut in half along the backbone axis (shown as line B in FIG. 4) of the bird. Cut in this direction, the body interior defines a cavity 44 exposed to the exterior of bird 40. In this embodiment, edible filling 46 in cavity 44 is visible from the cut side of bird 40. In another embodiment, an edible half bird 40 may include, in addition to edible filling 46, a portion of a solid or semi-solid food 48 such as a half of another bird breast lodged between edible filling 46 and the cavity-forming inner surface of the breast of half bird 40.

Ordinarily all of the foregoing embodiments of a stuffed poultry product as disclosed herein would be frozen, preferably flash frozen and packaged for sale, preferably by shrink wrapping.

An exemplary method to prepare the food product of the present invention, that is, an edible bird with a body cavity and stuffing in the body cavity, and heat transfer elements to facilitate safer cooked products, includes removing the visceral parts of an edible bird and removing substantially all of the interior bone structure that defines the body cavity of the bird. This includes cutting or separating is the thigh joints and wings joints. Cutting and removing a portion of the backbone, and removing the entire breastplate and rib cage. The visceral parts can then be removed and the body cavity can be cleaned.

After the cavity is formed and cleaned, edible filling is inserted into the body cavity. The bird is then sutured to close the body cavity, wrapped in cooking twine to secure the thighs and wings against the body of the bird, and rubbed with seasoning. Once prepared, the entire bird is flash frozen and shrink wrapped to seal in freshness.

According to an alternative embodiment of the present invention, the method to prepare the food product of the present invention also includes placing a portion of a separate solid or semi-solid food product near an interior surface of the body cavity and then filling the remaining portion of the body cavity with stuffing.

To cook the exterior and interior of the bird evenly, the present invention provides at least one heat transfer element adapted to penetrate the edible filling in the bird body to conduct heat from the exterior of the bird body into the body cavity and filling therein.

The present invention may also be provided in the form of a two part kit, the parts of which may be sold together or separately. The kit includes a frozen, eviscerated and substantially deboned, edible bird having stuffing disposed within the eviscerated cavity. Also provided in the kit are heat transfer elements adapted to expedite cooking of the stuffing concurrently with the cooking of the bird by placing the elements in a position penetrating at least some portion of the stuffing therein and optionally penetrating some part of the bird body.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A food product comprising
   an edible bird, including a body and an internal cavity within the body, the body cavity being free or mostly free of the bird's original visceral parts and internal bone structure;
   an edible filling disposed in the body cavity; and
   at least one heat transfer element passing from the exterior of the bird into the body cavity and the edible filling therein,
   said bird, including said filling and said at least one heat transfer element, packaged together for sale.

2. The food product of claim 1, wherein the edible bird is a turkey, chicken, duck, pheasant, or goose.

3. The food product of claim 1, wherein the edible bird is a turkey.

4. The food product of claim 1, wherein the at least one heat transfer element comprises a metallic rod having a handle at one end and a taper at the other end.

5. The food product of claim 4, wherein the rod is aluminum.

6. The food product of claim 1, wherein substantially all of the rib cage and breast plate, and about 90% of the backbone have been removed from the internal cavity.

7. The food product of claim 1, wherein the at least one heat transfer element passes through the body of the bird near a leg joint and traverses the internal cavity of the bird in a direction generally parallel to the line of the bird's original back bone.

8. The food product of claim 1, wherein the at least one heat transfer element passes from the exterior of the bird through some part of the body of the bird into the body cavity and the edible filling therein.

9. The food product of claim 1 further comprising a portion of a solid or semi-solid food separate from the bird body, which separate food portion is located between the edible filling disposed in the body cavity and the bird body.

10. The food product of claim 9, wherein the separate food portion is a boneless breast portion of a second bird and is located against an inner surface of the breast of the bird, which inner surface also defines an interior surface of the body cavity.

11. The food product of claim 1, wherein the at least one heat transfer element extends along the length of the bird through the bird body from a side of the body cavity near a thigh-body joint, through the edible stuffing, and to an opposite side of the body cavity near a wing body-joint.

12. The food product of claim 1, wherein the bird is a half of a bird cut lengthwise along the backbone of the bird and the body cavity comprises a concavity open to the exterior of the bird.

13. A food product comprising:
a ready-to-cook frozen half or whole turkey body;
stuffing occupying substantially all of a body cavity formed by the removal of the turkey visceral body parts, rib cage, breastplate, and most of the backbone of the of the turkey; and
at least one heat transfer element extending through some part of the turkey body and at least a portion of the stuffing in the body cavity,
wherein said product, including said stuffing and said at least one heat transfer element, is packaged for sale.

14. A method of preparing an edible bird with a body cavity and stuffing in the body cavity, the method comprising the steps of:
eviscerating an edible bird by removing substantially of the interior bone structure and visceral parts to form a body cavity of the bird;
inserting stuffing into the body cavity of the bird;
providing at least one heat transfer element adapted to conduct heat from the exterior of the bird body into the stuffing in the body cavity;
inserting the at least one heat transfer element into the stuffing;
freezing the bird with the stuffing and the at least one heat transfer member therein; and
packaging the bird, including the stuffing and at least one heat transfer element, for sale.

15. The method of claim 14 further comprising placing a portion of a separate solid or semi-solid food product next to an interior surface of the body cavity before inserting stuffing into the body cavity of the bird.

16. A kit comprising a frozen, eviscerated, and substantially deboned, edible bird having stuffing disposed within the eviscerated cavity and heat transfer elements adapted to expedite cooking of the stuffing concurrently with the cooking of the bird by placement in a position penetrating some part of the bird and at least some portion of the stuffing therein.

* * * * *